Figure 1:
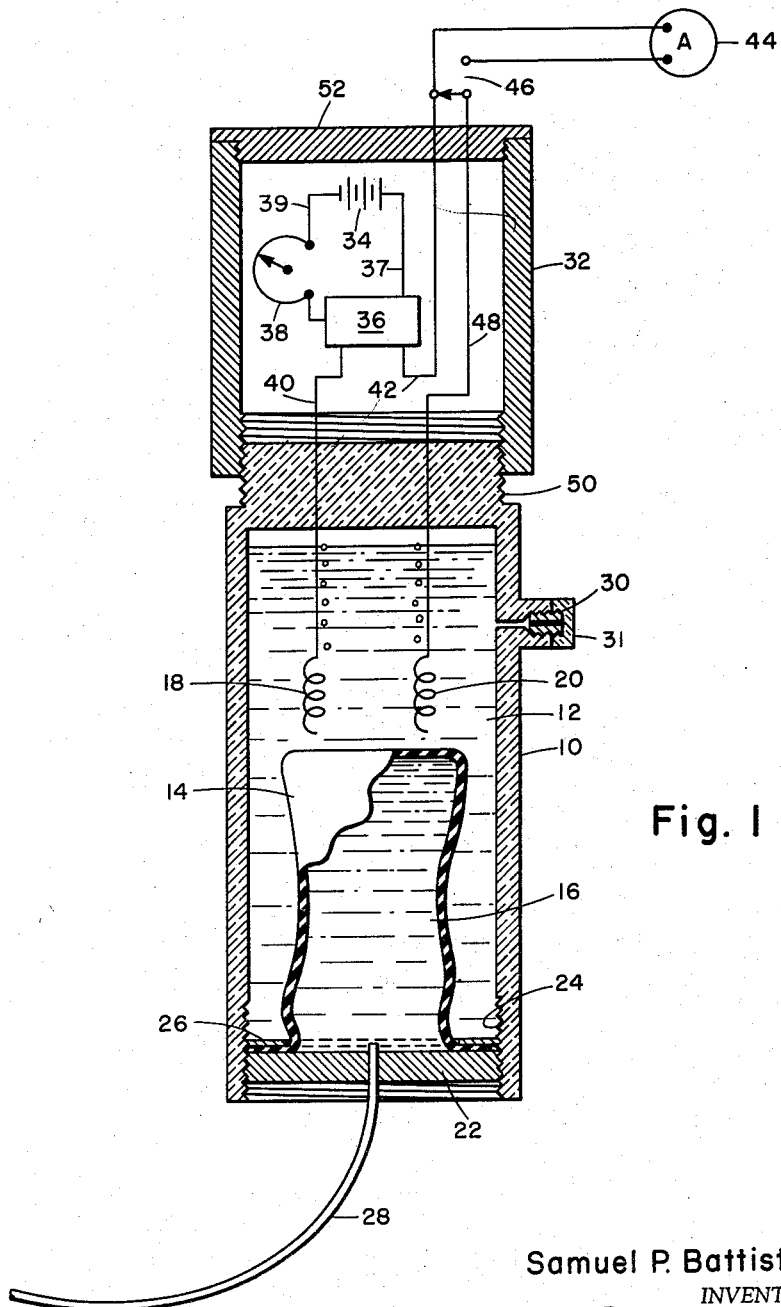

Dec. 24, 1963 S. P. BATTISTA 3,115,280
DEVICE FOR CONTINUOUS DELIVERY OF METERED AMOUNTS OF LIQUID
Filed June 7, 1961 2 Sheets-Sheet 1

Samuel P. Battista
INVENTOR.

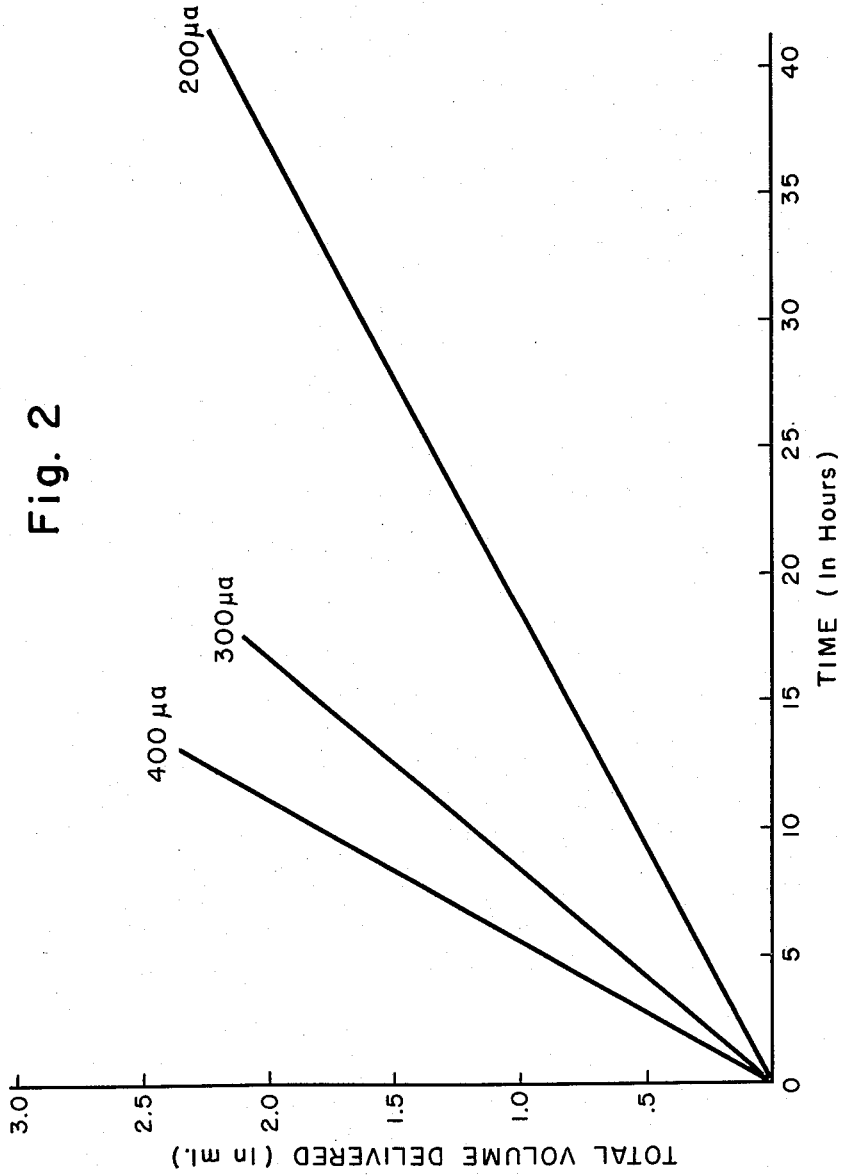

United States Patent Office 3,115,280
Patented Dec. 24, 1963

3,115,280
DEVICE FOR CONTINUOUS DELIVERY OF METERED AMOUNTS OF LIQUID
Samuel P. Battista, Arlington, Mass., assignor to Arthur D. Little, Inc., Cambridge, Mass., a corporation of Massachusetts
Filed June 7, 1961, Ser. No. 115,532
4 Claims. (Cl. 222—95)

This invention relates to a device adapted to deliver small to extremely small quantities of liquid to a desired location at a predetermined rate.

Known devices intended for such purposes have a number of disadvantages such as large size, complexity of parts, and inability to deliver small enough quantities of liquid, or to deliver the liquid continuously and in precisely regulated quantities. Furthermore, the apparatus of this invention can be regulated or controlled in such a way as to change the quantity or rate of delivery of a liquid as desired, e.g. by turning a screw or varying a voltage. Such programming of precise amounts, particularly for long periods of time (e.g. for days) with respect to extremely small quantities of liquid is not available in known apparatus, as far as I am aware.

It is therefore a principal object of this invention to provide a device or apparatus which is capable of delivering extremely small quantities of liquid, at desired locations, and at a predetermined rate or a series of programmed rates, and for intervals as long as a month. A further object is to provide such a device which is self-contained, and which is small and compact and can readily be carried in the hand. Other objects will appear as the description proceeds.

While this device is suitable for a number of purposes, such as delivering a liquid at a predetermined rate into the medium of a chemical reaction, or spotting slow drying materials onto a chromatogram, it is particularly useful in injecting extremely small, closely controlled quantities of infusion liquid into human beings or into animals, for treatment of diseases or for other medical purposes.

Briefly stated, the device of this invention comprises a sealed preferably transparent container filled with a liquid capable of being dissociated by passage therethrough of an electric current, into oxygen and hydrogen gas and having an impervious yet flexible reservoir within said liquid, which reservoir contains an infusion liquid which is to be delivered to a desired location through a tube passing from said reservoir to the outside of said container. The passage of electric current through the liquid causes hydrogen and oxygen gas to accumulate within the sealed container, thereby exerting pressure upon the reservoir and forcing the infusion liquid out through the tube.

This invention will be explained in more detail by reference to the accompanying drawings wherein FIG. 1 shows in section a side elevation of a preferred form of the device of this invention, and which is to be considered as illustrative rather than limiting, and FIG. 2 is a charge of typical deliveries of liquid at different operating currents.

In FIG. 1 the numeral 10 represents a hollow sealed container having a transparent wall so that the contents thereof may be readily viewed during the operation of the device. This container 10 is filled with an electrolyzable liquid which is capable of being dissociated into oxygen and hydrogen by the passage of an electric current therethrough. Such a liquid is conveniently a weakly acidic or alkaline aqueous medium 29 such as a weak solution of 0.001 to 0.1 N potassium hydroxide or of hydrochloric acid. In any event, the liquid 12 must be non-corrosive to the container or any of the structure therein. Positioned at one end of container 10 is a flexible reservoir 14 which may be made of thin rubber or other material which is flexible and impervious to the passage of liquids therethrough in either direction. This reservoir 14 contains infusion liquid 16. Electrodes 18 and 20, suitably of platinum, project into the body of electrolyzable liquid 12 from the end of the container 10 opposite that to which reservoir 14 is attached. The reservoir end may be sealed by plug 22 suitably threaded to fit corresponding threads 24 in the inside wall of container 10. A threaded ring 26 or other suitable device may be used to seal edges of the reservoir 14 against plug 22 in fluid-tight relation therewith. Tube 28 leads from within reservoir 14 outwardly from the apparatus through plug 22. Container 10 is provided with any suitable means for replenishing the liquid 12, such as by filling means 30 which is closed by cap 31.

At the opposite end of container 10 from plug 22 and tube 28 is a chamber 32. This chamber may be attached to container 10 in any suitable manner, as by meshing threads 50, and may have a cap 52. This chamber 32 is arranged to contain the power supply and regulators therefor. These consist of a miniature battery 34, a transistorized current regulator 36 and a rheostat 38, all of which perform in known fashion and therefore need not be described in detail. Battery 34 is connected to current regulator 36 by leads 37 and 39, and rheostat 38 is placed in one of these leads 39. From current regulator 36 leads 40 and 42 (the latter via lead 48) go to electrodes 18 and 20 respectively. It is convenient, although not necessary, to provide an ammeter 44 in the circuit of lead 42, as shown. This ammeter may be put into or taken out of the circuit as needed for adjusting current, by throwing switch 46 with the meter plug. In any event, the current passes from lead 42 into lead 48 either directly through switch 46, or through switch 46 and ammeter 44.

In operation, the rheostat 35 is set at whatever position is desired to provide the required current, and with container 10 full of electrolyzable liquid 12 and reservoir 14 full of infusion liquid 16, the current is caused to flow between electrodes 18 and 20. Gases accordingly accumulate in the top of container 10 thereby pushing down the liquid level of liquid 12 and exerting pressure upon reservoir 14. This pressure causes infusion liquid 16 to pass out through tube 28. Tube 28 may lead to any desired location and may be connected with other equipment or may terminate in a hypodermic needle or other device for injecting the infusion liquid into a human or animal recipient.

The infusion liquid in reservoir 14 may obviously be any liquid which it is desired to deliver in accordance with the present invention. This may be a liquid for preventing or curing disease in man or animals or may supply liquid to a chemical reaction or on to a chromatogram in controlled minute quantities. After the electrolysis of liquid 12 has continued until the infusion liquid 16 is substantially driven out of reservoir 14, the cap 31 on filling means 30 is removed, and infusion liquid is reintroduced into reservoir 14 through tube 28, thus driving the hydrogen and oxygen out of container 10 through filling means 30. Obviously, container 10 should be so held, during this operation, that filling means 30 is uppermost. The cap 31 is then replaced and the operation of the device is repeated as desired.

While battery 34, current regulator 36 and rheostat 38 are shown within chamber 32, any one or more of them may be located outside of the chamber. Furthermore, the walls of chamber 32 may be opaque or transparent. For convenience in portability, it is advantageous to have battery 34, current regulator 36, and rheostat 38 within chamber 32 and with the present day available miniature equipment this is entirely possible in most instances where only extremely small amounts of current are required. Rheostat 38 may, if desired, be eliminated if it is desired to program the feed through tube 28—i.e. to change the rate of feed from time to time. In such arrangement, means for establishing a variable voltage as desired are connected into lead 39, as from any suitable outside source. In this way also, rheostat 38 may be connected with any desired control system for programming the feed through tube 28 in response to some outside influence.

The current regulator 36, which may be of known type, assures that there will be no change in the current and voltages directed to electrodes 18 and 20 due to formation of gases around the electrodes, to a drop in the level of liquid 12, or to jarring of container 10 which would cause gases to be dislodged from the surfaces of the electrodes more rapidly than usual. The current regulator also presents any deleterious effects caused by polarizing, voltages, or currents.

As a typical example, I may provide a container 10 having a capacity of 30 ml. of liquid 12, and having reservoir 14 which has a capacity of 10 ml. of infusion liquid 16. Liquid 12 consists of a 0.01 N solution of potassium hydroxide in water. Delivery tube 28 is of 0.030 inch inside diameter and 0.048 inch outside diameter. With such an arrangement, the delivery through tube 28 is 0.180 ml. per hour when the current across electrodes 18, 20 is 400 microamperes at 3.9 volts. This is shown on the chart, FIG. 2, which also shows the deliveries through tube 28 of this arrangement at 300 and at 200 microamperes, over several hours' and days' time, and at 75–77° F.

The ability of this apparatus to deliver very small amounts of liquid is apparent from FIG. 2, wherein amounts delivered are shown as ordinates, against times as abscissae. Repeated runs under the conditions of the above-described example give results which do not vary in any significant degree from those shown by the lines of FIG. 2 except as they may be influenced by gross temperature changes. In other words, any significant variation in volume of infusion liquid delivered will be due only to expansion or contraction of the liquid due to gross temperature changes. Hence it is desirable to hold substantially constant the operating temperature of the apparatus and its contents.

Various modifications of this device within the scope of the appended claims will be obvious to those skilled in this art.

I claim:

1. Apparatus for delivering small quantities of a liquid, comprising a closed container, a first liquid and a second liquid in said container, a flexible partition in the form of a collapsible bag separating said first liquid and said second liquid and impermeable to each, said first liquid being electrolyzable into hydrogen and oxygen by the passage of an electric current therethrough, a pair of electrodes projecting through a wall of said container into said first liquid, a delivery tube passing through a wall of said container and arranged to provide communication between said second liquid and the outside of said container, means for supplying electric current across said electrodes, whereby to cause evolution of hydrogen and oxygen from said first liquid to form a body of gas within said container, thereby causing fluid pressure to be exerted upon said flexible partition and thus force said second liquid outwardly through said delivery tube, said evolved hydrogen and oxygen constituting the sole force acting within said container to cause the aforesaid delivery of said second liquid out through said delivery tube, said second liquid being forced permanently out of said apparatus, a passageway providing communication between the outside of said container and the interior thereof containing said first liquid, and cap means for sealing said passageway and thereby cutting off communication between said interior and outside.

2. Apparatus for delivering small quantities of a liquid, comprising a closed container, a first liquid and a second liquid in said container, a flexible partition in the form of a collapsible bag separating said first liquid and said second liquid and impermeable to each, said first liquid being electrolyzable into hydrogen and oxygen by the passage of an electric current therethrough, a pair of electrodes projecting through a wall of said container into said first liquid, a delivery tube passing through a wall of said container and arranged to provide communication between said second liquid and the outside of said container, and means for supplying electric current across said electrodes, whereby to cause evolution of hydrogen and oxygen from said first liquid to form a body of gas within said container, thereby causing fluid pressure to be exerted upon said flexible partition and thus force said second liquid permanently out of said apparatus through said delivery tube, said evolved hydrogen and oxygen constituting the sole force acting within said container to cause the aforesaid delivery of said second liquid out through said delivery tube.

3. Apparatus for delivering small quantities of a liquid, comprising a closed container, a first liquid and a second liquid in said container, a flexible partition in the form of a collapsible bag separating said first liquid and said second liquid and impermeable to each, said first liquid being electrolyzable into hydrogen and oxygen by the passage of an electric current therethrough, a pair of electrodes projecting through a wall of said container into said first liquid, a delivery tube passing through a wall of said container and arranged to provide communication between said second liquid and the outside of said container, means for supplying electric current across said electrodes, whereby to cause evolution of hydrogen and oxygen from said first liquid to form a body of gas within said container, thereby causing fluid pressure to be exerted upon said flexible partition and thus force said second liquid outwardly through said delivery tube, said evolved hydrogen and oxygen constituting the sole force acting within said container to cause the delivery of said second liquid out through said delivery tube, and permanently out of said apparatus, and control means for regulating the supply of said current at predetermined levels.

4. Apparatus as set forth in claim 3, further characterized in that said control means comprises a rheostat adapted to adjust the amount of current passing through said electrodes, and a current regulator adapted to provide constant current through said electrodes for any given setting of said rheostat.

References Cited in the file of this patent

UNITED STATES PATENTS

| 1,916,235 | Ruben | July 4, 1933 |
| 2,815,035 | Eskin et al. | Dec. 3, 1957 |
| 2,827,724 | Edds | Mar. 25, 1958 |
| 2,878,106 | Malmstadt | Mar. 17, 1959 |
| 2,915,030 | Perrier | Dec. 1, 1959 |
| 2,925,197 | Frebel | Feb. 16, 1960 |